United States Patent Office 3,554,682
Patented Jan. 12, 1971

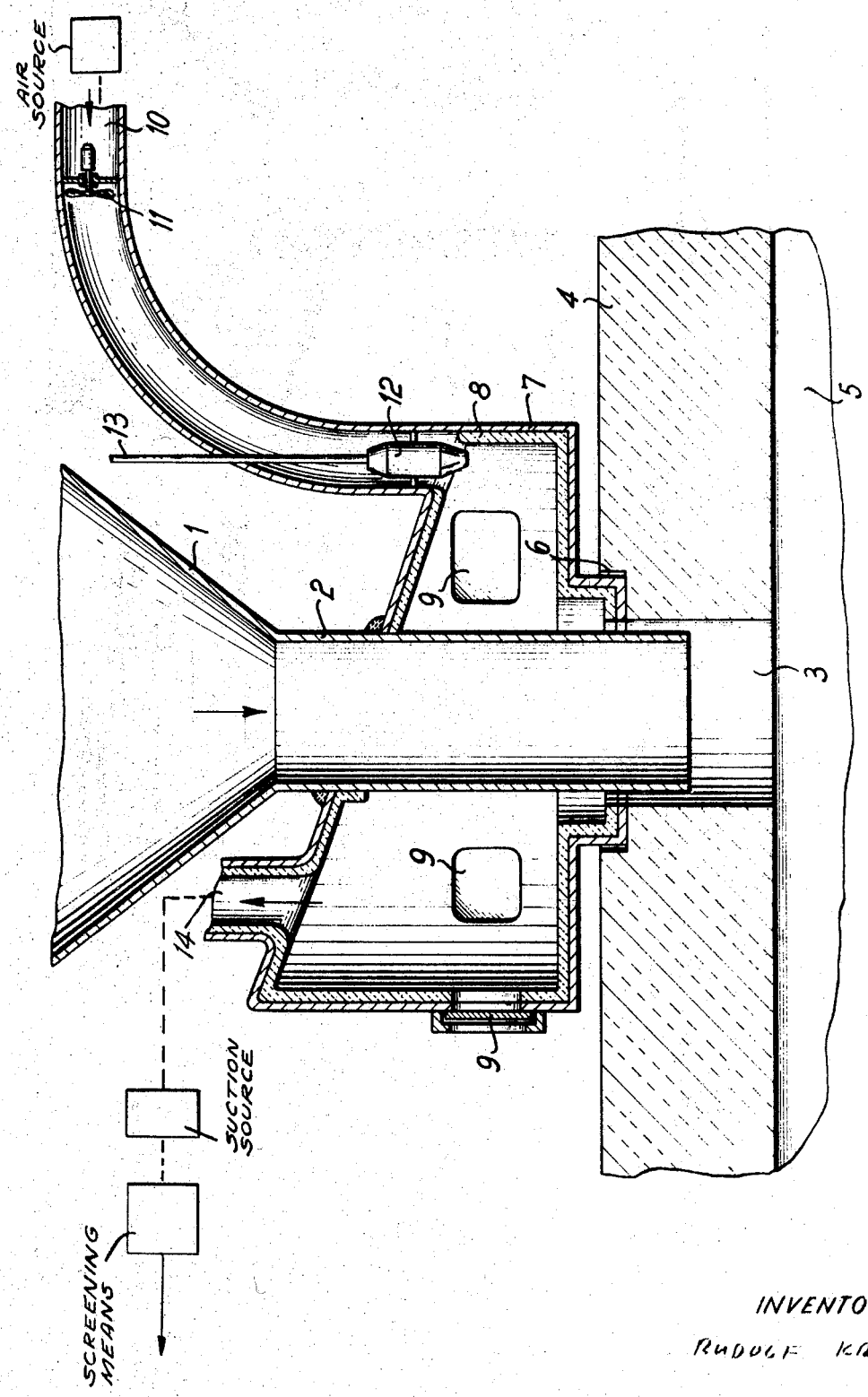

3,554,682
CHARGING ARRANGEMENT
Rudolf Krausse, Dortmund-Korne, Germany, assignor to Hoesch Maschinenfabrik Deutschland AG, Dortmund, Germany
Filed Dec. 5, 1968, Ser. No. 781,314
Int. Cl. F23d 17/00
U.S. Cl. 431—202                                    6 Claims

ABSTRACT OF THE DISCLOSURE

A charging arrangement for furnaces and the like includes a charging conduit the outlet opening of which is arranged to be placed into communication with the charge hole of the furnace. A suction conduit surrounds the charging conduit and has an inlet opening which communicates with the charge hole and through which combustible gases and particulate matter carried thereby can be withdrawn. The suction conduit is in part configurated as a combustion chamber. An air supply supplies air to the combustion chamber and a gas or oil burner is provided for igniting and combusting gas and particulate matter which is aspirated into the combustion chamber through the charge hole.

BACKGROUND OF THE INVENTION

The present invention relates generally to charging arrangements, and more particularly to an improved charging arrangement for use in the charging operation of industrial furnaces and the like.

It is known to charge industrial furnaces, for instance coke ovens, with combustible material such as coke, by placing a charging arrangement into communication with the charge hole of the furnace and introducing through the charging conduit of the charging arrangement the combustible material into the charge hole and thus into the furnace. Of course, gases exist in the interior of the furnace and are displaced when new combustible material is introduced into the charge hole. These gases also carry particulate matter, such as dust and particles of coal. The gases are withdrawn by the charging arrangement, usually by a suction conduit surrounding the charging conduit with some spacing, and may then either be discharged or further treated.

Particularly, in cases where the aspirated gases carry significant quantities of particulate combustible matter, such as coal dust and the like, it is not desirable to discharge them without further treatment, and in many instances, laws and ordinances forbid discharging without such treatment to remove the particles from the gases. For such circumstances it is known to combust the gases and thereby the particles which they carry prior to venting to the atmosphere. Subsequently, the combusted gases are then scrubbed and discharged. The ignition of the gases is accomplished in these arrangements by electrical igniting devices and it is here that the present invention is intended to introduce a much-needed improvement.

The known electrical igniting devices must necessarily be exposed and subjected to the high temperature of the gases aspirated from the interior of the furnace, just as they necessarily must undergo fouling by these gases and particulate matter carried therein. As a result of this, electrical igniting devices in these charging arrangements do not operate reliably so that non-combusted gases carrying particulate contaminants will frequently escape to the ambient atmosphere, adding to the already objectionably severe air pollution.

It is, accordingly, an object of the present invention to overcome the aforementioned problems.

A more specific object of the invention is to provide a charging arrangement of the type in question which is not possessed of these disadvantages.

Another object of the invention is to provide such a charging arrangement wherein the gases withdrawn from the furnace, together with any particulate matter which they carry, will be reliably combusted and wherein the possibility of malfunctioning is completely eliminated or at least decreased to an irreducible minimum.

SUMMARY OF THE INVENTION

In pursuance of the above objects, and others which will become apparent hereafter, one feature of my invention resides in providing, in a charging arrangement for furnaces and similar receptacles having charge holes, a combination comprising charging conduit means having an outlet opening arranged to be placed in communication with a charge hole, and suction conduit means surrounding the charging conduit means and having an inlet opening arranged to communicate with the charge hole for withdrawing from the latter combustible gases and particulate matter carried thereby. The suction conduit means comprises a portion which is constructed as and constitutes a combustion chamber. Air supply means communicates with the combustion chamber to supply combustion air thereto, and burner means in form of a fuel-fluid burner communicates with the combustion chamber and serves for combusting the mixture of air and gases in the combustion chamber. Finally, suction means communicates with the suction conduit means so as to draw gases and particulate matter from the furnace through the charge hole into the combustion chamber, and for exhausted gases from the combustion chamber.

By utilizing a burner operating with a fuel fluid, that is a gas or oil burner, I obtain reliable and complete combustion of gase in every instance of use of the device. Furthermore, and in accordance with another feature of my invention, I find it advantageous to so locate the burner that it is positioned in the stream of incoming combustion ar, that is downstream of the source of combustion air. This causes the combustion air to constantly sweep the burner, cooling the same for preventing overheating of the control circuit for the burner, and preventing fouling of the burner nozzle and the electrical arrangement for the burner by the combustible gases and particulate matter carried thereby.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single figure is a fragmentary sectional elevation illustrating my novel invention.

DESCRIPTION OF THE PREFERRED EMBODIMENTS

It will be seen that I have illustrated and identified with reference numeral 4 the upper wall of a furnace, which may be assumed to be a coke oven, the interior of which is identified with reference numeral 5. In the upper wall 4 there is provided a charge hole 3 whose upper end is stepped, as at 6.

When the oven is to be charged, a charging arrangement, commonly known as a charging bell, is placed in registry with the charge hole 3 so that it rests in the recess 6 thereof. Combustible material, such as coal or the like, is introduced into the funnel-shaped hopper 1 and from there enters the oven 5 through the charging conduit 2 whose outlet end is located in registry with the charge hole 3.

An outer suction conduit 7 surrounds the inner charging conduit 2 with some clearance, defining therewith a gap which also communicates with charge hold 3. A suction source, illustrated diagrammatically in the drawing, communicates through the conduit 14 with the interior of a portion of the suction conduit 7 which is configurated, as illustrated, as a combustion chamber surrounding the charging conduit 2 outside of the charge hole 3. Suction applied to this combustion chamber via the conduit 14 serves to aspirate combustible gases and particulate matter carried thereby from the interior 5 of the furnace through the charge hole 3 and the gap between the conduits 2 and 7 into the combustion chamber. Advantageously, the interior of the combustion chamber is provided with a lining 8 of fireproof material. Access openings in the suction conduit 7 are closed with covers 9 consisting of heat-resistant material, for instance a suitable type of steel.

In accordance with my invention I have an air supply conduit 10 communicate with the combustion chamber, which conduit 10 receives air from an air source which is illustrated diagrammatically, the air being supplied to facilitate combustion in the combustion chamber. I locate a fuel-fluid utilizing burner 12, such as a gas or oil burner, in the stream of incoming combustion air, advantageously within the outlet opening of the conduit 10 as illustrated. By doing this I assure that the incoming combustion air, which is advanced by the blower 11 of known construction, continuously sweeps over the burner 12, cooling the same and preventing fouling thereof. The pipe 13 supplies fuel fluid to the burner 12, that is gas or oil.

The air supplied through the conduit 10 is sufficient to support the combustion of the fuel fluid utilized in the burner 12 as well as the combustion of combustible gases in the combustion chamber, the ignition and combustion of which gases is accomplished by the operation of the burner 12.

The combusted gases resulting from combustion of the combustible gases aspirated from the interior 5 of the furnace as well as from combustion of the fuel fluid in the burner 12, are withdrawn from the interior of the combustion chamber by the aforementioned suction source through the conduit 14 for further treatment, for example for treatment in a scrubbing installation of known construction. The burner 12 may be of any well known type and it is its particular location in the incoming combustion air, in conjunction with the fact that it operates by combusting fuel fluid such as gas or oil, which provides the advantages obtained with my novel invention.

It will be understood that each of the elements described above, or two or more together, may also find a useful application in other types of constructions differing from the types described above.

While the invention has been illustrated and described as embodied in a charging arrangement for furnaces and the like, it is not intended to be limited to the details shown, since various modifications and structural changes may be made without departing in any way from the spirit of the present invention.

What is claimed is:

1. In a charging arrangement for furnaces and like receptacles having charge holes, a combination comprising charging conduit means having an outlet opening arranged to be placed in communication with a charge hole; suction conduit means surrounding said charging conduit means and having an inlet opening arranged to communicate with said charge hole for withdrawing through the latter combustible gases and particulate matter carried thereby, said suction conduit means comprising a portion constituting a combustion chamber; air supply means communicating with said combustion chamber for supply combustion air thereto; burner means communicating with said combustion chamber and operative for combusting therein at least the mixture of combustion air and combustible gases; suction means communicating with said suction conduit means for aspirating gases and particulate matter into the same and for withdrawing the combusted gases and particulate matter from said combustion chamber; and scrubbing means for scrubbing particulate matter from said combusted gases downstream of said combustion chamber.

2. In an arrangement as defined in claim 1, said burner means being an oil burner.

3. In an arrangement as defined in claim 1, said burner means being a gas burner.

4. In an arrangement as defined in claim 1, said air supply means including an air supply conduit communicating with said combustion chamber, and said burner means being located at least substantially within said air supply conduit.

5. In an arrangement as defined in claim 4, said air supply means further comprising blower means arranged in said air supply conduit upstream of said burner means.

6. In an arrangement as defined in claim 1; and further comprising a fireproof lining provided at least in said combustion chamber.

References Cited

UNITED STATES PATENTS

| 1,155,492 | 10/1915 | Krene | 110—8 |
| 2,653,555 | 9/1953 | Hatton et al. | 110—118 |

FOREIGN PATENTS

| 520,966 | 7/1953 | Belgium | 263—29 |
| 1,128,589 | 4/1962 | Germany | 110—8 |

EDWARD G. FAVORS, Primary Examiner

U.S. Cl. X.R.

110—118